United States Patent
Chakravarthi et al.

(10) Patent No.: US 12,116,915 B2
(45) Date of Patent: Oct. 15, 2024

(54) EXHAUST PIPE BRIDGE

(71) Applicant: Tenneco Automotive Operating Company Inc., Northville, MI (US)

(72) Inventors: Rangan Chakravarthi, Jackson, MI (US); Aaron Adams, Grass Lake, MI (US); Mark Thompson, Grass Lake, MI (US); Scott D. Carper, Grass Lake, MI (US); Pavel Robles, Jackson, MI (US); Daryn Davenport, Cement City, MI (US)

(73) Assignee: Tenneco Automotive Operating Company Inc., Northville, MI (US)

( * ) Notice: Subject to any disclaimer, the term of this patent is extended or adjusted under 35 U.S.C. 154(b) by 22 days.

(21) Appl. No.: 18/089,995

(22) Filed: Dec. 28, 2022

(65) Prior Publication Data

US 2024/0218821 A1  Jul. 4, 2024

(51) Int. Cl.
   *F01N 13/18* (2010.01)
   *F16L 41/08* (2006.01)
   *F16L 41/12* (2006.01)

(52) U.S. Cl.
   CPC ........ *F01N 13/1805* (2013.01); *F16L 41/084* (2013.01); *F16L 41/12* (2013.01)

(58) Field of Classification Search
   CPC ............. F01N 13/1805; F01N 13/1838; F01N 13/1844; F01N 13/185; F01N 13/1855; F16L 41/084; F16L 41/12
   USPC ................ 285/188, 124.2, 124.3, 133.3, 197
   See application file for complete search history.

(56) References Cited

U.S. PATENT DOCUMENTS

| | | | | |
|---|---|---|---|---|
| 3,860,269 A | * | 1/1975 | Horton | F28F 9/26 285/47 |
| 4,213,640 A | * | 7/1980 | Miles | F28F 9/26 285/915 |
| 4,930,549 A | * | 6/1990 | Renner | D06F 39/081 138/104 |
| 5,018,349 A | | 5/1991 | Pemberton | |
| 5,697,155 A | * | 12/1997 | Bloecker | F16L 41/03 72/62 |
| 6,497,402 B2 | * | 12/2002 | Tharp | B01F 23/2311 261/122.1 |
| 7,874,401 B2 | | 1/2011 | Uhlemann et al. | |

(Continued)

FOREIGN PATENT DOCUMENTS

| | | |
|---|---|---|
| CN | 102619607 A | 8/2012 |
| CN | 202544981 U | 11/2012 |
| DE | 102011010595 A1 | 8/2012 |

*Primary Examiner* — James M Hewitt, II
(74) *Attorney, Agent, or Firm* — Harness, Dickey & Pierce, P.L.C.

(57) ABSTRACT

An exhaust system comprises a first exhaust pipe having a first aperture, a second exhaust pipe having a second aperture and a bridge mechanically and fluidically interconnecting the first and second exhaust pipes. The bridge includes a first plate including a first curved portion sealingly fixed to an outer surface of the first exhaust pipe. The bridge includes a second plate including a second curved portion sealingly fixed to an outer surface of the second exhaust. The first and second plates each include first and second coupling tubes including first and second frustoconical portions to funnel exhaust from the first exhaust pipe toward the second exhaust pipe and vice versa. The first plate is sealingly coupled to the second plate.

17 Claims, 7 Drawing Sheets

(56) References Cited

U.S. PATENT DOCUMENTS

| | | | |
|---|---|---|---|
| 8,127,540 B2 * | 3/2012 | Harada | F01N 3/2882 |
| | | | 181/251 |
| 8,950,178 B2 * | 2/2015 | Miki | F01N 13/1838 |
| | | | 60/322 |
| 2020/0318509 A1 * | 10/2020 | Mahira | F01N 13/1838 |

* cited by examiner

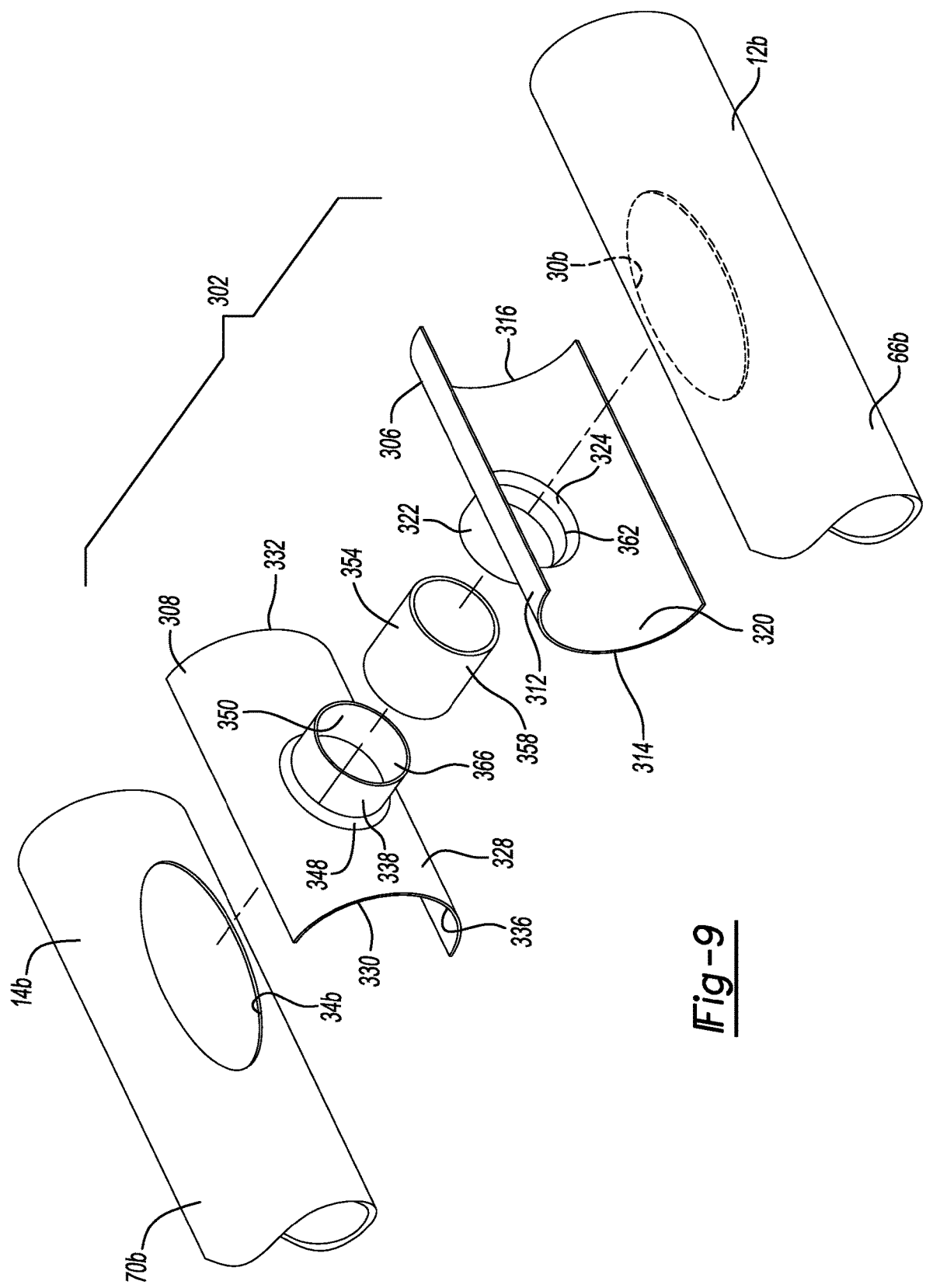

EXHAUST PIPE BRIDGE

FIELD

The present disclosure generally relates to an exhaust system for an internal combustion engine. More particularly, an economically manufactured dual exhaust system with crossover communication is discussed.

BACKGROUND

This section provided background information related to the present disclosure which is not necessarily prior art.

Internal combustion engines emit exhaust gas from combustion chambers. Exhaust manifolds or headers collect and channel the exhaust emitted from the combustion chambers. In many instances, one exhaust manifold will collect the exhaust gas emitted from half of the combustion chambers while another exhaust manifold or header collects the exhaust emitted from the remaining combustion cylinders. A first exhaust pipe acts a conduit for transferring the exhaust from the first exhaust manifold to atmosphere while a second and separate exhaust pipe acts as a conduit for exhaust traveling through the second exhaust manifold.

It is known that certain advantages exist to fluidically interconnect the first exhaust pipe with the second exhaust pipe via a crossover pipe or an X-pipe. Known cross-over pipe configurations require several separate pipe sections to be connected to one another typically using multiple welds extending 360 degrees at each pipe joint. Construction of such an assembly is costly and time consuming. It may be advantageous to provide an alternate structure and method of interconnecting exhaust pipes.

SUMMARY

An exhaust system comprises a first exhaust pipe having a first aperture, a second exhaust pipe having a second aperture and a bridge mechanically and fluidically interconnecting the first and second exhaust pipes. The bridge includes a first plate including a first curved portion sealingly fixed to an outer surface of the first exhaust pipe. The bridge includes a second plate including a second curved portion sealingly fixed to an outer surface of the second exhaust. The first and second plates each include first and second coupling tubes including first and second frustoconical portions to funnel exhaust from the first exhaust pipe toward the second exhaust pipe and vice versa. The first plate is sealing coupled to the second plate.

In another arrangement, an exhaust system for a vehicle having an internal combustion engine comprises a first exhaust pipe including a first end having an inlet, a second opposite end having an outlet, and a first aperture extending through a wall of the first exhaust pipe at a position between the inlet and the outlet. A second exhaust pipe includes a first end having an inlet, a second opposite end having an outlet, and a second aperture extending through a wall of the first exhaust pipe at a position between the inlet and the outlet.

A bridge mechanically and fluidically interconnects the first and second exhaust pipes. The bridge includes a first plate including a first curved shell portion having an inner surface positioned adjacent to and sealingly fixed to an outer surface of the first exhaust pipe. The first plate includes a second curved shell portion having an inner surface positioned adjacent to and sealingly fixed to an outer surface of the second exhaust pipe. The first plate further includes a first web interconnecting the first curved shell portion to the second curved shell portion. The first web has a first guide surface to funnel exhaust from the first exhaust pipe toward the second exhaust pipe and a second guide surface to funnel exhaust from the second exhaust pipe toward the first exhaust pipe.

The bridge further includes a second plate including a third curved shell portion having an inner surface positioned adjacent to and sealingly fixed to an outer surface of the first exhaust pipe. The second plate includes a fourth curved shell portion having an inner surface positioned adjacent to and sealingly fixed to an outer surface of the second exhaust pipe. The second plate further includes a second web interconnecting the third curved shell portion to the fourth curved shell portion. The second web has a first guide surface to funnel exhaust from the first exhaust pipe toward the second exhaust pipe and a second guide surface to funnel exhaust from the second exhaust pipe toward the first exhaust pipe. The first plate is sealing coupled to the second plate.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 9 is an exploded prospective view of a portion of the exhaust system depicted in FIG. 7.

In the drawings, reference numbers may be reused to identify similar and/or identical elements.

DETAILED DESCRIPTION

Figure 1:
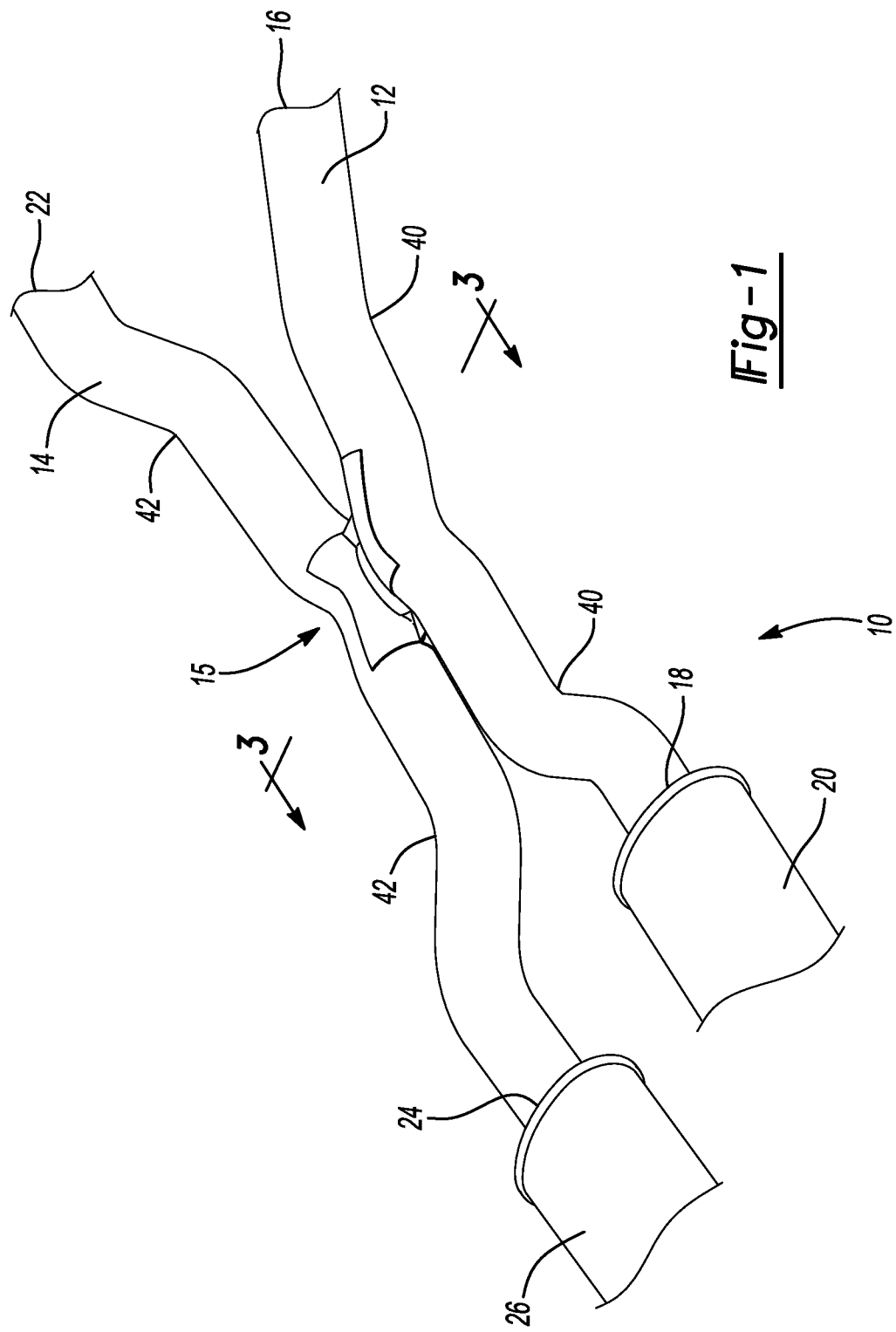
FIG. 1 is a fragmentary prospective view of an exhaust system constructed in accordance with the teachings of the present disclosure.

An exemplary exhaust system 10 is depicted at FIG. 1. Exhaust system 10 includes a first exhaust pipe 12 and a second exhaust pipe 14 mechanically and fluidically interconnected by a bridge 15. First exhaust pipe 12 includes an inlet 16 at one end and an outlet 18 at a second opposite end. To economically construct exhaust system 10, it should be appreciated that first exhaust pipe 12 may be constructed as a one-piece monolithic tube extending from inlet 16 to outlet 18. Inlet 16 is in receipt of exhaust emitted from a first set of cylinders of an internal combustion engine (not shown). Outlet 18 is coupled to an inlet of a first muffler 20. Second exhaust pipe 14 is substantially similar to first exhaust pipe 12. In particular, second exhaust pipe 14 includes an inlet 22 in receipt of exhaust emitted from a different set of combustion cylinders of the internal combustion engine. Second exhaust pipe 14 includes an outlet 24 positioned at an opposite end from inlet 22. Second exhaust pipe 14 may be constructed as a one-piece monolithic member extending from inlet 22 to outlet 24. Outlet 24 of second exhaust pipe 14 is coupled in fluid communication with a second muffler 26.

To facilitate a mixing of the exhaust within first exhaust pipe 12 and within second exhaust pipe 14, prior to entry in either of first muffler 20 or second muffler 26, first exhaust pipe 12 includes a first aperture 30 extending through a first wall 32 of first exhaust pipe 12. Similarly, a second aperture 34 extends through a second wall 36 of second exhaust pipe 14. To minimize the size of bridge 15, it may be beneficial to impart bends on one or both of first exhaust pipe 12 and second exhaust pipe 14 to position the portions of exhaust pipe including first aperture 30 and second aperture 34 physically proximate one another. As such, first exhaust pipe 12 includes one or more bends 40 to position first aperture 30 laterally inboard or otherwise close to second exhaust pipe 14. Similarity, second exhaust pipe 14 includes one or more bends 42 to position second aperture 34 proximate first aperture 30.

It should be appreciated that the size of shape of first aperture 30 and second aperture 34 need not be particularly defined. It may be beneficial, however, to choose a shape and size such as an oval that may be economically created during the manufacturing process.

Bridge 15 is constructed from two separate components including a first plate 46 and a second plate 48. It is envisioned that both first plate 46 and second plate 48 are constructed from metal sheets having relatively complex shapes imparted during a stamping or drawing operation. Alternatively, bridge 15 may be a one-piece component manufactured using casting, forging, or a machining processes.

Because first exhaust pipe 12 and second exhaust pipe 14 are relatively long members constructed from metal, it is of great importance to assure bridge 15 robustly mechanically interconnects first exhaust pipe 12 with second exhaust pipe 14 while concurrently providing a sealed chamber that contains exhaust within one of first exhaust pipe 12, second exhaust pipe 14 or an internal cavity 52 positioned between first plate 46 and second plate 48. To provide a robust structural interconnection, first plate 46 includes a first curved shell 56 and a second curved shell 58 interconnected by a flange or web 60. Web 60 includes a first seat 61 and a second seat 63 adapted to engage portions of second plate 48 as what will be described later. First seat 61 and second seat 63 are substantially planar surfaces lying in a common plane.

Figure 2:
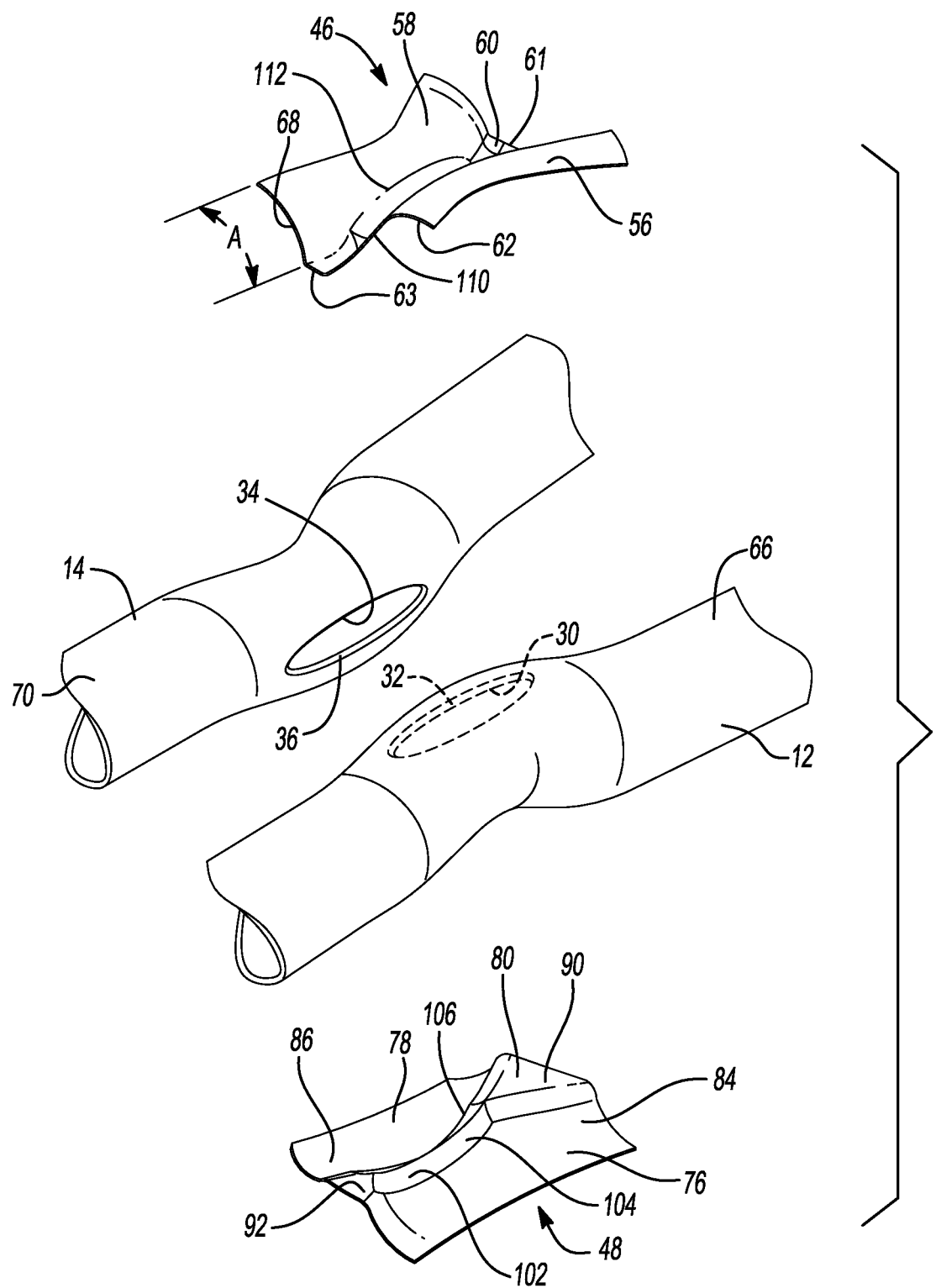
FIG. 2 is a fragmentary exploded view depicting a crossover communication portion of the exhaust system shown in FIG. 1.
Figure 3:
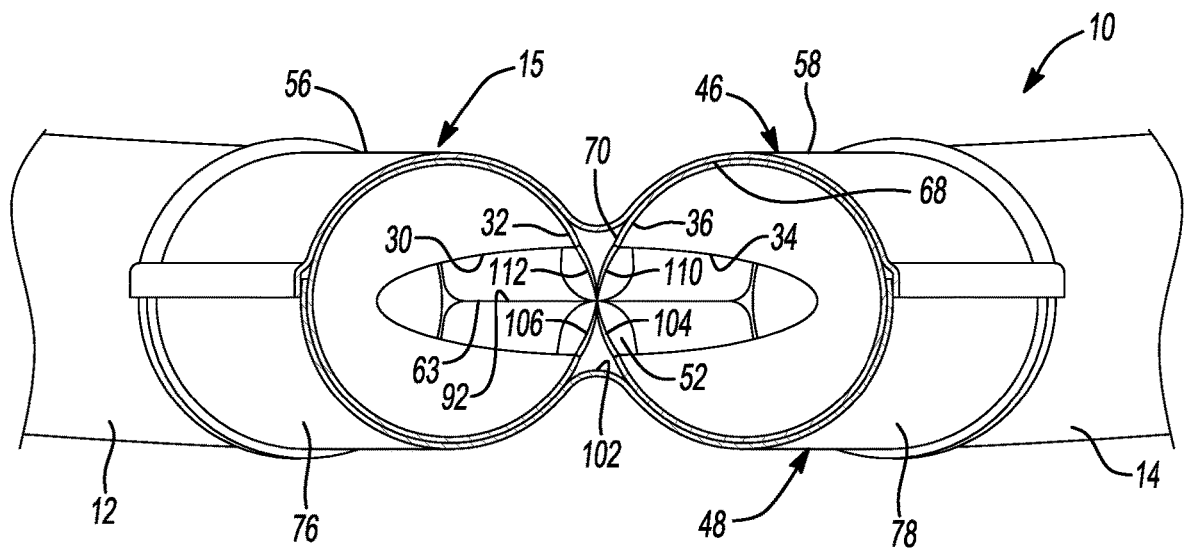
FIG. 3 is a cross-sectional view taking through the exhaust system at line 3-3 shown in FIG. 1.

First curved shell 56 includes an inner surface 62 sized and shaped to conform to an outer surface 66 of first exhaust pipe 12. Second curved shell 58 includes an inner surface 68 sized and shaped to conform to an outer surface 70 of second exhaust pipe 14. First curved shell 56 and second curved shell 58 may also be considered as quarter-pipes circumferentially extending about outer surfaces 66, 70 substantially 90 degrees as depicted at angle A in FIG. 2. Angle A may range substantially from 60-90 degrees.

Second plate 48 is substantially similar to first plate 46. Second plate 48 includes a third curved shell 76 and a fourth curved shell 78 interconnected by a web 80. Third curved shell 76 includes an inner surface 84 sized and shaped to conform to outer surface 66 of first exhaust pipe 12. Fourth curved shell 78 includes an inner surface 86 sized and shaped to conform to outer surface 70 of second exhaust pipe 14. Web 80 includes a first planar pad 90 and a second planar pad 92. It is not necessary but it is envisioned that first planar pad 90 and second planar pad 92 lie on a common plane.

A recess 102 is longitudinally positioned between first planar pad 90 and second planar pad 92. Recess 102 includes a first guide surface 104 tapered to urge exhaust gas to flow from first exhaust pipe 12 toward second exhaust pipe 14. A second guide surface 106 surface is on the opposite side of recess 102 and tapered to urge exhaust gas to flow from second exhaust pipe 14 toward first exhaust pipe 12. Web 60 of first plate 46 includes similar first and second guide surfaces 110, 112 to urge exhaust gas to flow from first exhaust pipe 12 toward second exhaust pipe 14.

To provide a leak free joint, it may be beneficial to fix first plate 46 to second plate 48 to form a subassembly prior to coupling either plate to first exhaust pipe 12 or second exhaust pipe 14. First plate 46 is positioned adjacent to second plate 48 such that first seat 61 extends substantially parallel to and directly engages first planar pad 90. Second seat 63 extends substantially parallel to and directly engages second planar pad 92. Welds are applied to sealingly fix first plate 46 to second plate 48. While it may be advantageous to create the subassembly of the first and second plates prior to fixing the plate subassembly to the exhaust pipes, it is envisioned that the first and second plates 46, 48 may be positioned proximate the first and second exhaust pipes 12, 14 prior to any beginning any welding process. The plates would then be welded to the pipes and each other.

In nearly all vehicle applications, the exhaust pipes follow a circuitous path around or through various underbody components of the vehicle. To finalize assembly of exhaust system 10 to a given vehicle, it is contemplated that first exhaust pipe 12 must be fed through one or more openings to obtain a near final position under the vehicle prior to interconnecting the first exhaust pipe to first muffler 20 or to second exhaust pipe 14 via bridge 15. As such, another step of assembly exhaust system 10 to a vehicle includes feeding second exhaust pipe 14 around or through various structures of the vehicle to position second exhaust pipe 14 in a desired position parallel to and adjacent first exhaust pipe 12. Once first exhaust pipe 12 and second exhaust pipe 14 are properly positioned under the vehicle, the plate subassembly is disposed such that first plate 46 is positioned to engage inner surface 62 with outer surface 66 as well engage inner surface 68 with outer surface 70.

Second plate 48 is moved into position such that inner surface 84 contacts outer surface 66 of first exhaust pipe 12 while inner surface 86 is positioned into contact with outer surface 70 of second exhaust pipe 14. Once the subassembly of first plate 46 and second plate 48 is arranged in this manner, welds are applied to the edges of first plate 46 and second plate 48 that are adjacent outer surfaces 66, 70 of first exhaust pipe 12 and second exhaust pipe 14. At the completion of welding, a fluid tight coupling is made between first exhaust pipe 12 and second exhaust pipe 14 as well as first plate 46 and second plate 48. Exhaust within first exhaust pipe 12 is now in fluid communication with exhaust in second exhaust pipe 14 via first aperture 30, second aperture 34 and internal cavity 52.

Figure 4:
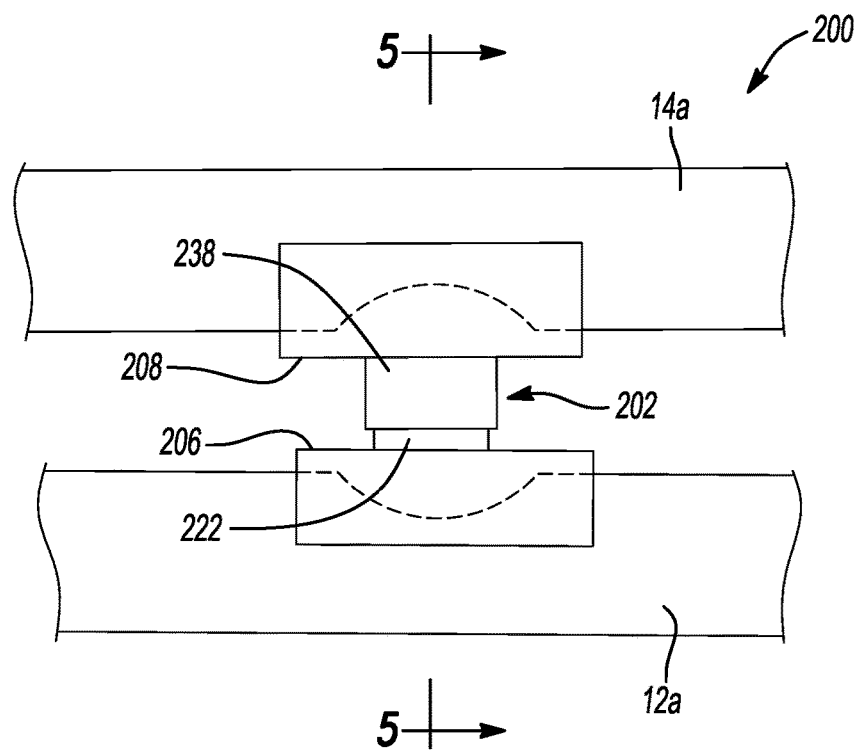
FIG. 4 is a fragmentary top view of another exhaust system constructed in accordance with the teachings of the present disclosure.
Figure 5:
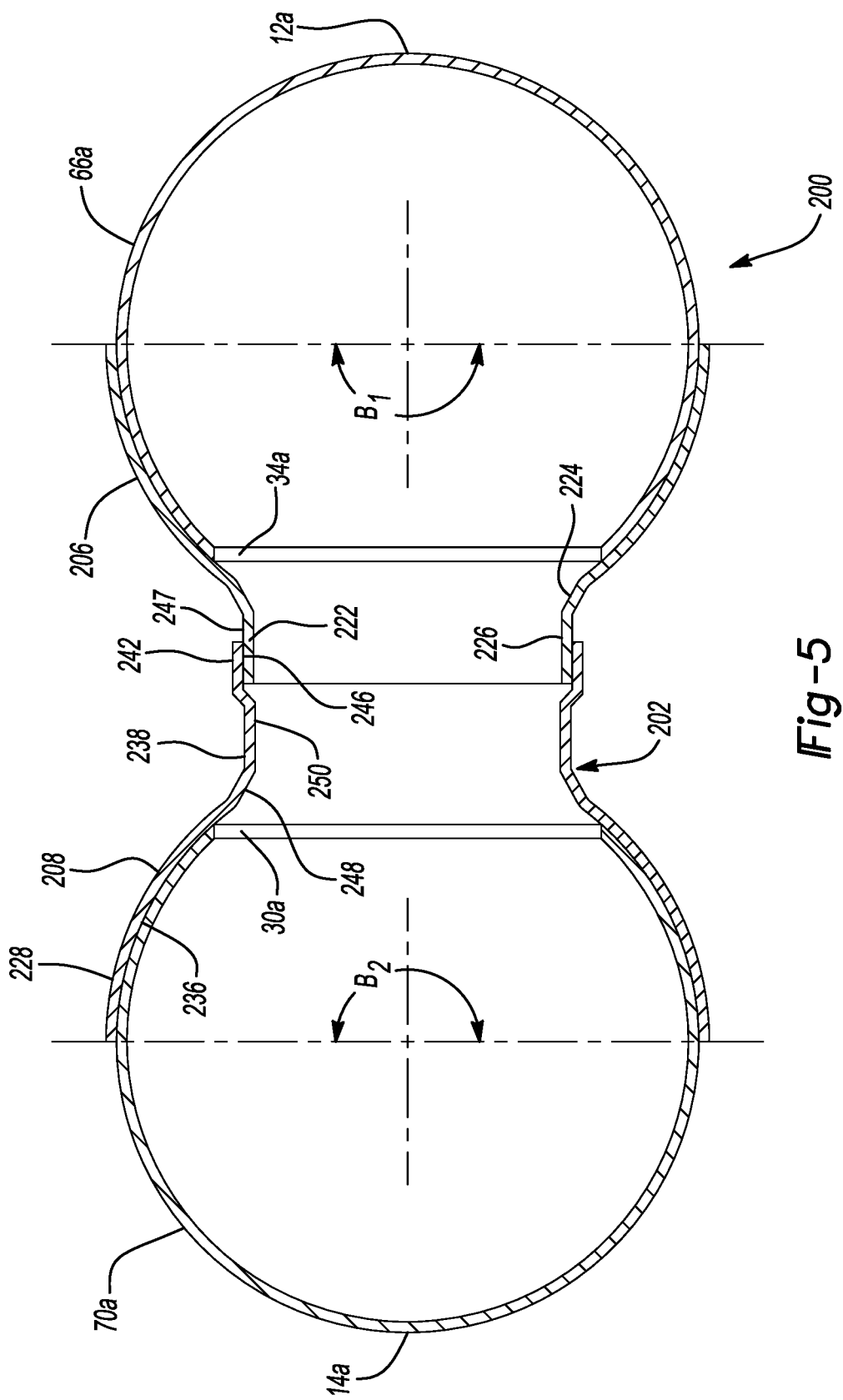
FIG. 5 is a cross-sectional view taken along line 5-5 as depicted in FIG. 4.
Figure 6:
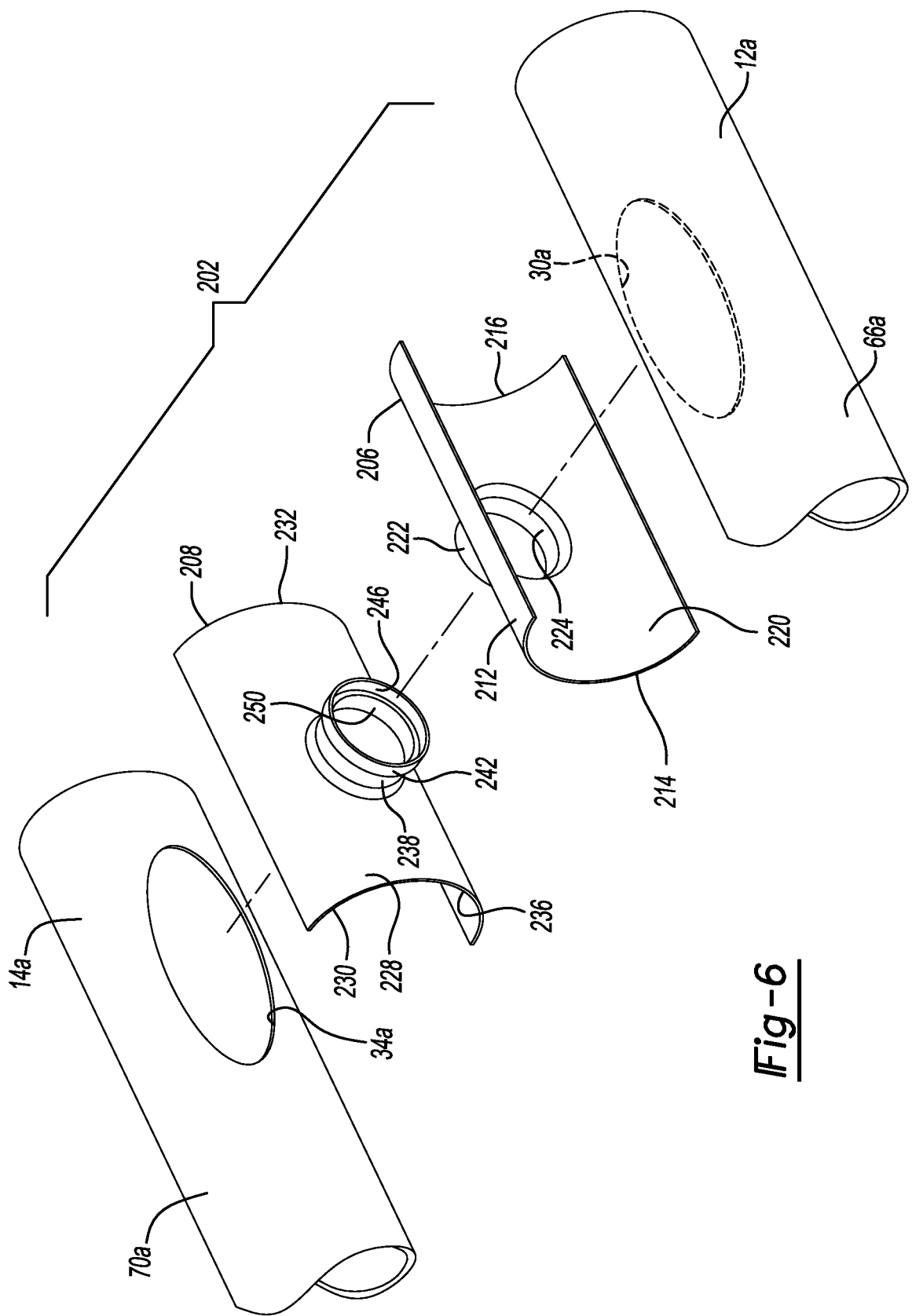
FIG. 6 is an exploded prospective view of a portion of the exhaust system depicted in FIG. 4.

FIGS. 4-6 depict an alternate embodiment exhaust system identified at reference numeral 200. Exhaust system 200 exhibits similarities to exhaust system 10. Accordingly, like elements will retain their previously introduced reference numerals including an "a" suffix. A bridge 202 mechanically and fluidically interconnects first exhaust pipe 12a with second exhaust pipe 14a. First exhaust pipe 12a includes aperture 30a extending through its sidewall while second exhaust pipe 14a includes aperture 34a extending through its sidewall.

Bridge 202 includes a first cap 206 sealingly coupled to a second cap 208. First cap 206 includes a curved first sidewall 212 extending longitudinally from a first end 214 to a second opposite end 216. Curved first sidewall 212 includes an inner surface 220 sized and shaped as a portion of a cylinder to conform to and directly engage outer surface 66a of first exhaust pipe 12a. First sidewall 212 circumferentially extends an angle B1. FIG. 5 depicts angle B1 as 180 degrees. It should be appreciated that angle B1 may range from 90-180 degrees. First cap 206 includes a first coupling tube 222 radially outwardly extending from curved first sidewall 212. First coupling tube 222 includes a tapered, or as particularly depicted, a frustoconical portion 224 extending from curved first sidewall 212 and a flange or cylindrical portion 226. The tapered or frustoconical shape of portion 224 acts a funnel to urge fluid flow from first exhaust pipe 12a toward second exhaust pipe 14a. An oval shape of aperture 34a further urges exhaust flow in the same direction.

Second cap 208 includes a curved second sidewall 228 longitudinally extending from a first end 230 to a second end 232, opposite first end 230. Curved second sidewall 228 includes a curved inner surface 236 sized and shaped as a portion of a cylinder to conform to and engage with outer surface 70a of second exhaust pipe 14a. Second sidewall may circumferentially extend less than semi-cylindrically from 90 to 180 degrees. In FIG. 5, B2 is depicted as 180 degrees. Second cap 208 further includes a second coupling tube 238 radially outwardly extending from curved second sidewall 228. Second coupling tube 238 includes a flange or flared distal end 242 having an inner surface 246 sized and shaped to engage an outer surface 247 of first coupling tube 222.

Second coupling tube 238 further includes a tapered or frustoconical portion 248 extending from curved second sidewall 228 and a cylindrical portion 250. The tapered or frustoconical shape of portion 248 acts a funnel to urge fluid flow from second exhaust pipe 14a toward first exhaust pipe 12a. An oval shape of aperture 30a further urges exhaust flow in the same direction.

Depending on the exact specifications of the vehicle to which exhaust system 200 is to be installed, first cap 206 may be welded to first exhaust pipe 12a before or after first exhaust pipe 12a is installed within the vehicle. Similarly, depending on the clearances between vehicle components and second exhaust pipe 14a, second cap 208 may be welded to outer surface 70a before or after second exhaust pipe 14a is positioned within the vehicle. First coupling tube 222 is inserted within second coupling tube 238 such that inner surface 246 encircles at least a portion of first coupling tube 222. At this time, a continuous 360° weld is applied to fix first coupling tube 222 to second coupling tube 238.

Figure 7:
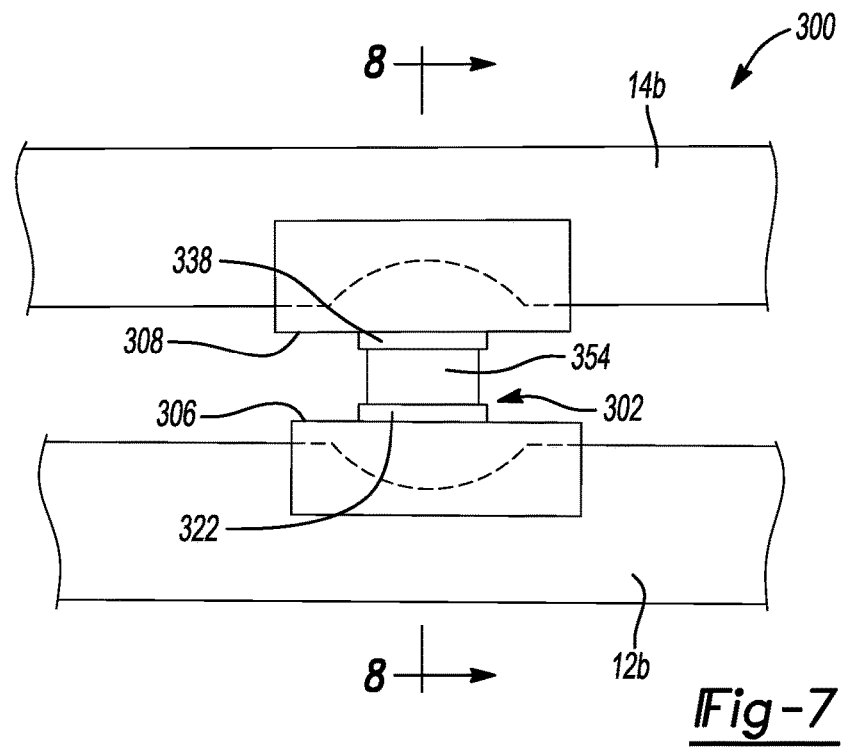
FIG. 7 is a fragmentary top view of another exhaust system constructed in accordance with the teachings of the present disclosure.
Figure 8:
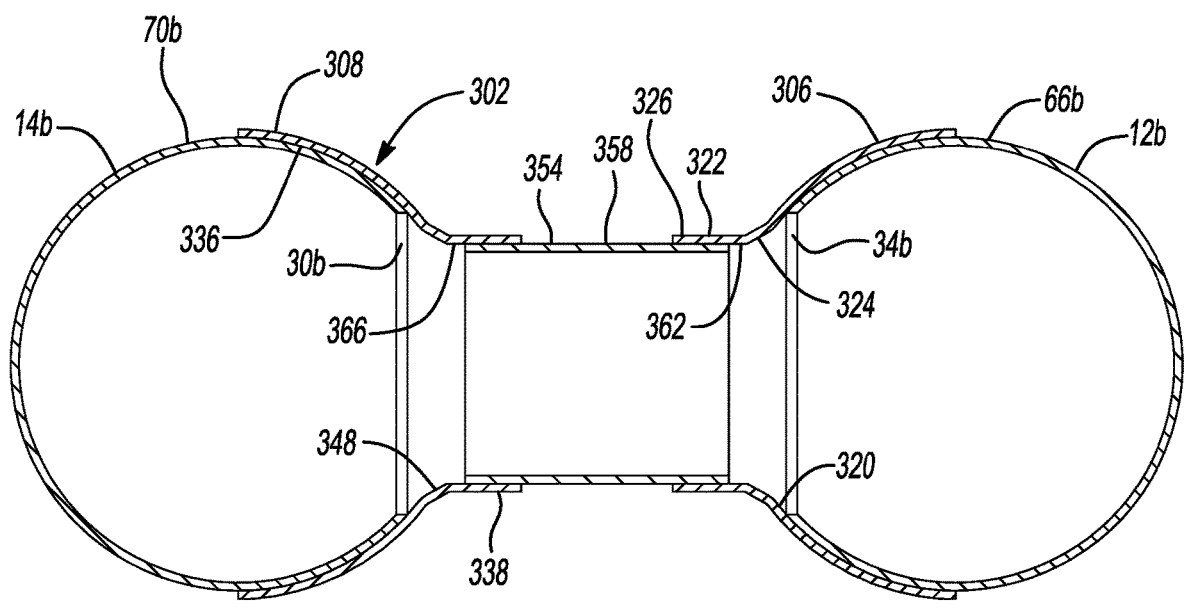
FIG. 8 is a cross-sectional view taken along line 8-8 as depicted in FIG. 7.

FIGS. 7-9 depict an alternate embodiment exhaust system 300. Exhaust system 300 is substantially similar to exhaust system 10 and exhaust system 200. Like elements will retain previously introduced numerals including a "b" suffix. A bridge 302 mechanically and fluidically interconnects first exhaust pipe 12b with the second exhaust pipe 14b. First exhaust pipe 12b includes aperture 30b extending through its sidewall while second exhaust pipe 14b includes aperture 34b extending through its sidewall.

Bridge 302 includes a first cap 306 sealingly coupled to a second cap 308. First cap 306 includes a curved first sidewall 312 extending longitudinally from a first end 314 to a second opposite end 316. First sidewall 312 includes an inner surface 320 sized and shaped to conform to and directly engage outer surface 66b of first exhaust pipe 12b. First cap 206 includes a first coupling tube 322 radially outwardly extending from curved first sidewall 312. First coupling tube 322 includes a tapered or frustoconical portion 324 extending from curved first sidewall 312 and a cylindrical portion 326. The tapered or frustoconical shape of portion 324 acts a funnel to urge fluid flow from first exhaust pipe 12b toward second exhaust pipe 14b. An oval shape of aperture 34b further urges exhaust flow in the same direction.

Second cap 308 includes a curved second sidewall 328 longitudinally extending from a first end 330 to a second end 332, opposite first end 330. Curved second sidewall 328 includes a curved inner surface 336 sized and shaped to conform to and engage with outer surface 70b of second exhaust pipe 14b. In similar fashion to the previous embodiment, first sidewall 312 and second sidewall 328 may circumferentially extend between 90 and 180 degrees. Second cap 308 further includes a second coupling tube 338 radially outwardly extending from curved second sidewall 328. Second coupling tube 338 further includes a tapered or frustoconical portion 348 extending from curved second sidewall 328 and a cylindrical portion 350. The tapered or frustoconical shape of portion 348 acts a funnel to urge fluid flow from second exhaust pipe 14b toward first exhaust pipe 12b. An oval shape of aperture 30b further urges exhaust flow in the same direction.

Bridge 302 includes a transfer tube 354 mechanically and fluidically interconnecting first cap 306 with second cap 308. An outer surface 358 of transfer tube 354 is sized and shaped to provide a slip fit interconnection with an inner surface 362 of first coupling tube 322. A similar slip fit is provided between outer surface 358 and inner surface 366 of second coupling tube 338.

Depending on the exact specifications of the vehicle to which exhaust system 300 is to be installed, first cap 306 may be welded to first exhaust pipe 12b before or after first exhaust pipe 12b is installed within the vehicle. Similarly, depending on the clearances between vehicle components and second exhaust pipe 14b, second cap 308 may be welded to outer surface 70b before or after second exhaust pipe 14b is positioned within the vehicle. Transfer tube 354 is inserted within first coupling tube 322 such that an overlap exists. Transfer tube 354 is also inserted within second coupling tube 238 such that inner surface 366 encircles at least a portion of transfer tube 354. At this time, two continuous 360° welds are applied to fix first coupling tube 322 and second coupling tube 338 to transfer tube 354.

The embodiments described earlier illustrate the flexibility in which exhaust systems may be constructed to ease assembly, minimize cost, minimize the total number of welds and the total length of weld required in a given exhaust assembly.

What is claimed is:

1. An exhaust system for a vehicle having an internal combustion engine, the exhaust system comprising:
   a first exhaust pipe including a first end having an inlet, a second opposite end having an outlet, and a first aperture extending through a wall of the first exhaust pipe at a position between the inlet and the outlet;
   a second exhaust pipe including a first end having an inlet, a second opposite end having an outlet, and a second aperture extending through a wall of the first exhaust pipe at a position between the inlet and the outlet; and a bridge mechanically and fluidically interconnecting the first and second exhaust pipes, the bridge including a first plate including a first curved portion having an inner surface positioned adjacent to and sealingly fixed to an outer surface of the first exhaust pipe and circumferentially extending about a portion of the first exhaust pipe, wherein the first plate includes a radially outwardly extending first coupling tube in fluid communication with the first aperture, the first coupling tube including a first tapered portion to funnel exhaust from the first exhaust pipe toward the second exhaust pipe, wherein the bridge further includes a second plate including a second curved portion having an inner surface positioned adjacent to and sealingly fixed to an outer surface of the second exhaust pipe and circumferentially extending about a portion of the second exhaust pipe, the second plate including a radially outwardly extending second coupling tube in fluid communication with the second aperture, the second coupling tube including a second tapered portion to funnel exhaust from the second exhaust pipe toward the first exhaust pipe, the first coupling tube being sealingly coupled to the second coupling tube.

2. The exhaust system of claim 1, wherein the first plate and the second plate define an internal cavity in communication with the first aperture and the second aperture.

3. The exhaust system of claim 1, wherein the first plate includes a flange fixed to the second plate.

4. The exhaust system of claim 1, wherein the first coupling tube includes a flared distal end in receipt of a portion of the second coupling tube.

5. The exhaust system of claim 1, further comprising a transfer tube including a first end fixed to the first coupling tube and an opposite second end fixed to the second coupling tube.

6. The exhaust system of claim 1, wherein the first exhaust pipe and the second exhaust pipe are spaced apart a distance spanned by the bridge.

7. The exhaust system of claim 1, wherein the first tapered portion is coaxially aligned with the second tapered portion.

8. The exhaust system of claim 1, wherein the first curved portion circumferentially extends an angle ranging from 90-180 degrees.

9. The exhaust system of claim 8, wherein the second curved portion circumferentially extends an angle ranging from 90-180 degrees.

10. The exhaust system of claim 1, wherein the first tapered portion is frustoconical.

11. The exhaust system of claim 10, wherein the second tapered portion is frustoconical.

12. An exhaust system for a vehicle having an internal combustion engine, the exhaust system comprising:

a first exhaust pipe including a first end having an inlet, a second opposite end having an outlet, and a first aperture extending through a wall of the first exhaust pipe at a position between the inlet and the outlet;

a second exhaust pipe including a first end having an inlet, a second opposite end having an outlet, and a second aperture extending through a wall of the first exhaust pipe at a position between the inlet and the outlet; and a bridge mechanically and fluidically interconnecting the first and second exhaust pipes, the bridge including a first plate including a first curved shell portion having an inner surface positioned adjacent to and sealingly fixed to an outer surface of the first exhaust pipe, the first plate including a second curved shell portion having an inner surface positioned adjacent to and sealingly fixed to an outer surface of the second exhaust pipe, the first plate further including a first web interconnecting the first curved shell portion to the second curved shell portion, the first web having a first guide surface to funnel exhaust from the first exhaust pipe toward the second exhaust pipe and a second guide surface to funnel exhaust from the second exhaust pipe toward the first exhaust pipe, wherein the bridge further includes a second plate including a third curved shell portion having an inner surface positioned adjacent to and sealingly fixed to an outer surface of the first exhaust pipe, the second plate including a fourth curved shell portion having an inner surface positioned adjacent to and sealingly fixed to an outer surface of the second exhaust pipe, the second plate further including a second web interconnecting the third curved shell portion to the fourth curved shell portion, the second web having a first guide surface to funnel exhaust from the first exhaust pipe toward the second exhaust pipe and a second guide surface to funnel exhaust from the second exhaust pipe toward the first exhaust pipe, the first plate being sealing coupled to the second plate.

13. The exhaust system of claim 12, wherein the first plate is a one-piece metal sheet and the second plate is a one-piece metal sheet.

14. The exhaust system of claim 12, wherein the first plate includes a planar portion and the second plate includes a planar portion in engagement with the planar portion of the first plate.

15. The exhaust system of claim 12, wherein the first plate and the second plate are fixed to the first exhaust pipe, the second exhaust pipe and each other via welds.

16. The exhaust system of claim 12, wherein the first exhaust pipe and the second exhaust pipe are spaced apart a distance spanned by the bridge.

17. The exhaust system of claim 12, wherein the first plate and the second plate define an internal cavity in communication with the first aperture and the second aperture.

* * * * *